Patented Apr. 5, 1938

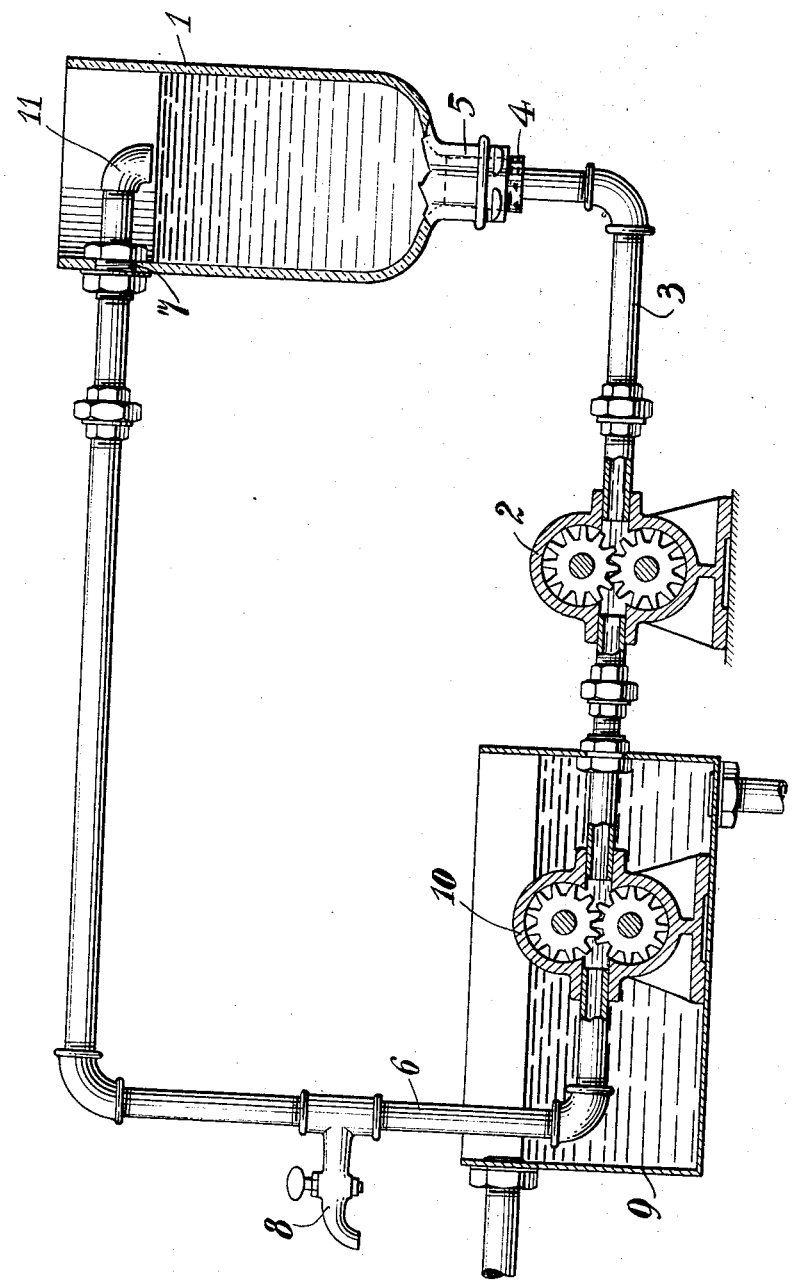

2,113,496

UNITED STATES PATENT OFFICE 2,113,496

REACTION BETWEEN ORGANIC SALTS OR SOAPS AND OTHER MATERIALS

Leo Roon, New York County, N. Y., and Walter Gotham, Union Township, Union County, N. J., assignors to Nuodex Products Co., Inc., Elizabeth, N. J., a corporation of New York Application February 9, 1932, Serial No. 591,920

8 Claims. (Cl. 134—57)

This invention relates to reactions between organic salts or soaps and other materials, and is herein illustrated as applied to the production of certain water-insoluble soaps.

Hitherto water-insoluble soaps have generally been obtained in the form of impure sticky materials with inclusions of water, of soluble or other salts, and of other impurities. These sticky materials have been difficult to purify, in fact almost impossible to purify by any reasonable number of washings, and, after washing, the materials usually were dried by heat and frequently fused, but were awkward and expensive to handle in any of these stages.

According to the present invention the foregoing and other difficulties and objections are overcome by causing the reactions of formation of the desired materials to take place in the presence of two intimately commingled immiscible liquids, forming two phases. It has usually been found advantageous to use water for the liquid of one phase and a petroleum product sold under the name of mineral spirits, a turpentine substitute for use in paints, as the liquid of the other phase.

Under these conditions the water-insoluble soap dissolves in the petroleum product as rapidly as it is formed, and most of the other reaction products and impurities usually dissolve in the water, thus separating and washing the reaction products at once. When mineral spirit is thus used for producing a cobalt or manganese or lead soap suitable for use as a paint or varnish drier the resulting solution of soap in the mineral spirit is often ready to be mixed with the other paint materials or with the cooked varnish materials, thus rendering it unnecessary to adopt any special steps to get the special soap into the final product. If the pure soap itself is wanted a highly volatile mineral spirit is used and can be readily evaporated, leaving the soap behind. It is possible to carry out the process in the laboratory by vigorously hand-shaking a bottle partly full of the reacting solutions, including the two immiscible solvents, preferably adding one solution in small lots. Vigorous agitation is essential, and many types of violent agitation are satisfactory provided they break the immiscible solvents into small particles or fine droplets so that the two solvents are intimately commingled.

It has been found satisfactory, on a large scale, to dissolve or suspend such material as a water-soluble soap either in a batch of water or in the water-immiscible liquid and to dissolve the material to react with the soap in another batch of water and then commingle the solutions by flowing a small stream of one solution into a vigorously agitated stream of the other solution containing or consisting of the solvent immiscible with the first solution, as, for example, flowing a stream of a water solution of a cobalt salt together with a hydrocarbon solvent through an agitating device while a water solution of soap is slowly flowed into the larger agitated stream. No protective colloids in either solution have been found necessary or advisable.

Under the conditions described it is found that the reactions proceed rapidly and evenly, so that when a cobalt salt is used to yield a cobalt soap the end point of the reaction is clearly indicated when the pink color in the water due to cobalt used is just discharged, and substantially all the blue color is in the hydrocarbon solution. Thus the soaps separated from the hydrocarbon solvent are obtained substantially pure,—technically or pharmaceutically pure,—provided suitable raw materials have been used.

As a result the process is well adapted for rapid commercial production of a wide variety of materials in a single compact and easily cleaned apparatus. In fact the process often operates so as to leave the apparatus clean.

The product is usually produced in the cold, and, in any event, the process makes it possible to avoid discoloring or otherwise deteriorating the final product by the high heat usually required for drying. Thus a more stable product is obtained. Moreover, when a hydrocarbon or other solution of a water-insoluble soap is desired containing a given content of metal, the desired final hydrocarbon solution is easily and accurately obtained as the direct product of the reaction.

Other features and advantages will hereinafter appear in connection with the following examples showing how the procedures have been applied.

The accompanying drawing shows diagrammatically one apparatus suitable for carrying out the process.

*Example 1.*—A solution of twenty grams of lead acetate, $Pb(C_2H_3O_2)_2 \cdot 3H_2O$, in 100 cc. of water was poured into the open bottom of an inverted gallon bottle 1, of which the bottom had been cut off. There was also poured in 50 grams of mineral spirits sold by Standard Oil Company under the name "Varsol", and the contents were mixed by starting a ⅜ inch gear rotary pump 2 so as to draw liquid through a ⅜ inch tube 3 passing through a cork 4 closing the neck 5 of the bottle and force the liquid through a tube 6 adapted to carry the liquid back into the bottle 1 through a side opening 7 near the top, and discharge it vertically into the liquid above its surface at 11. Then there was poured slowly into the circulating and agitated liquid mass about 200 cc. of water carrying in solution sodium naphthenates made from naphthenic acid with an acid number of 180 and an apparent molecular weight of 318, until a chromate indicator test of the water settling from a sample of the circulating liquid mass showed that the lead had completely reacted with the naphthenates. The sodium naphthenates were sometimes found to serve the purpose best when they contained a slight amount of free naphthenic acids. The product was then drawn off through a pet cock 8 in the tube 6 and the watery material allowed to settle, leaving a pure lead naphthenate in solution in the mineral spirit, ready to be used as a paint drier, preferably after dilution with more mineral spirit. If the water solution separated slowly from the mineral spirit, warming facilitated their separation.

The tube 6 included a second gear pump 8 similar to the pump 2, located in a tank 9 so that the tank could be filled with heating or cooling water if needed to alter the temperature of the circulating liquid mass. Both pumps were adapted to be electrically operated, and yielded a satisfactory product in less than twenty or even less than ten minutes when circulating liquid at a rate of 8 to 10 gallons a minute, so that the bottle contents looked like a perfect emulsion containing air.

*Example 2.*—A solution in mineral spirits containing 16 pounds of lead per 100 pounds of solution was made by pouring a water solution carrying 29.6 pounds of $Pb(C_2H_3O_2)_2.3H_2O$ into a fifty gallon barrel, together with 39 pounds of the mineral spirit, and circulated in a stream through the barrel by withdrawing through a bottom tube into a manifold, drawing into a second manifold by four two-inch Gould rotary gear pumps running in parallel at high speed, and delivered from the second manifold vertically into the liquid near the top of the barrel, thus being thoroughly agitated. There was slowly poured into the stream flowing through the barrel one hundred pounds of water solution carrying 56.5 pounds of sodium naphthenates. The reaction seemed to be complete at once. Though the liquid mass eventually filled the barrel more than half full, the operation took no more than ten minutes. The liquid mass was drawn off, allowed to settle and the desired solution of lead in mineral spirit was separated by drawing off the water.

*Example 3.*—A solution of cobalt naphthenates in mineral spirits, was made, carrying 4% of cobalt, by dissolving 17 pounds of cobalt chloride $CoCl_2.6H_2O$ in 100 pounds of water, pouring it into the same barrel, adding 56 pounds of the mineral spirit, agitating by driving the pumps, and then slowly adding 43 pounds sodium naphthenates in water solution. The resulting solution contained 4% of cobalt metal as naphthenates.

*Example 4.*—A solution of silver naphthenates carrying 5 parts of silver per hundred parts of solution was made by dissolving 7.8 grams of silver nitrate in water, agitating in the gallon bottle apparatus with 81.5 grams of the mineral spirit, and slowly adding a water solution containing 15.4 grams of potassium naphthenates, and the desired solution was obtained as in other examples. The solution was altered by light, and needed to be kept in amber-colored bottles.

It has been found that other organic solvents may be substituted for the mineral spirits and that soaps of other acids may be obtained by the same process.

*Example 5.*—17 grams of the cobalt chloride were disolved in water, and agitated with 28.65 grams of commercial xylol mixed with the same weight of the mineral spirits, and there was slowly added a solution of 42.7 parts of potassium abietate in water. The desired solution was obtained carrying 4 parts of cobalt abietate per hundred parts of solution in mixed organic solvents.

*Example 6.*—15 grams of ferric sulphate, $Fe_2(SO_4)_3.9H_2O$ in water solution and 50 grams of the xylol were agitated by the same process with 53.2 grams of potassium naphthenates in water solution, to yield fifty parts of iron naphthenates in fifty parts of xylol, or three parts of iron per hundred parts of xylol solution.

*Example 7.*—14.3 grams of manganese chloride $MnCl_2.4H_2O$ in water solution and 53 grams of an almost water-white pine oil were agitated by the same process, and similarly mixed with 51 grams of potassium naphthenates in water solution, yielding a solution containing four parts of manganese in one hundred parts of pine oil solution.

*Example 8.*—A parallel result was obtained when xylol was substituted for the pine oil.

*Example 9.*—12.1 grams nickel chloride, $NiCl_2.6H_2O$, in water solution, and 34 grams each of xylol and mineral spirits were agitated and similarly mixed with 32 grams of potassium naphthenates in water solution, yielding a solution carrying 3% of nickel.

More complicated solutions can be easily and directly prepared, provided the raw materials are so chosen that no interfering precipitation takes place until the final agitation brings about precipitation.

*Example 10.*—17.8 grams manganese chloride, $MnCl_2.4H_2O$, in water solution and 50 grams xylol were agitated and similarly mixed with 28.75 grams potassium naphthenates and 30 grams of sodium linoleate in water solution, yielding a solution containing manganese naphthenates and linoleate.

*Example 11.*—17.5 grams zinc sulphate, $ZnSO_4.7H_2O$, in water solution were agitated with 68 grams xylol and similarly mixed with 23 grams potassium naphthenates and 21 grams sodium linoleate in water solution, yielding a solution carrying zinc as linoleate and as naphthenates.

*Example 12.*—A water solution carrying 3.6 grams lead acetate $Pb(C_2H_3O_2)_2.3H_2O$ and 1.78 grams manganese chloride $MnCl_2.4H_2O$ was agitated with 87 grams of the mineral spirit and similarly mixed with 6.2 grams potassium naphthenates and 6 grams potassium abietate in water solution, yielding a solution of lead and manganese naphthenates and abietates in mineral spirit.

*Example 13.*—A water solution containing 11.7 grams of copper sulphate, $CuSO_4.5H_2O$, was agitated with 68.7 grams in the mineral spirit and similarly mixed with a water solution of 32.1 grams of potassium naphthenates, yielding a solution of copper naphthenates.

It is found that the material to react with the soluble soap to form the insoluble soap need not be a salt and need not be wholly in solution in the water carrying it, as appears in the following examples.

Example 14.—100 cc. of water carrying 8.6 grams calcium sulphate, in the form of a milk, was agitated with 200 grams of xylol and mixed in the same manner with 100 cc. of water carrying 32.2 grams of potassium naphthenates yielding a solution of calcium naphthenates.

The organic soap-forming radical may be dissolved in the organic solvent instead of in water, as is illustrated in the following example, where naphthenic acids were used. Similar procedure has been followed where soaps were used.

Example 15.—200 cc. of water carrying 23 grams of barium hydroxide $Ba(OH)_2$ was agitated with 200 grams of mineral spirit carrying in solution 45.4 grams of naphthenic acids, yielding an organic solution of barium naphthenates.

Example 16.—100 cc. of water carrying 12.1 grams aluminum sulphate $Al_2(SO_4)_3.18H_2O$ was agitated with a mixture of fifty grams of the mineral spirit and fifty grams of xylol and mixed as in the earlier examples with 36 grams of potassium naphthenates in aqueous solution, yielding an organic solution of aluminum naphthenates.

Example 17.—100 cc. of water carrying 5.1 grams of mercuric nitrate was agitated with 300 grams of xylol and mixed as in the earlier examples with 11.7 grams of potassium naphthenates in aqueous solution, yielding an organic solution mercury naphthenates, somewhat turbid when cold but becoming clear when warmed.

Example 18.—100 cc. of water carrying 7.7 grams of chromic nitrate were agitated with 200 grams of the mineral spirits and then mixed as in the earlier examples with 20 grams of potassium naphthenates in aqueous solution, yielding a solution carrying chromium naphthenates.

Example 19.—20 grams of stannic chloride dissolved in 100 grams of water were agitated with 200 grams of the mineral spirit, and a water solution of sodium naphthenates was added until a sample of the agitated mixture showed no precipitate in the lower or aqueous layer when removed, yielding a solution of tin naphthenates.

By salts of drying metals, as used in accordance with this invention, is meant the salts of the following metals, viz: Pb, Co, Fe, Mn, Ni, Zn, Cu, Ca, Ba, Al and Cr.

Having thus described certain embodiments of the invention, what is claimed is:

1. Process of producing a liquid drier for paints and varnishes having, as an active ingredient, an oil-soluble normal metal salt of a non-aromatic organic acid, which comprises reacting together, at a temperature below the boiling point of water, an aqueous solution of an alkali metal salt of such organic acid, and an aqueous solution of an inorganic drying metal salt in the immediate presence of a liquid coating composition thinner which is a solvent for the oil-soluble reaction product which is substantially insoluble in water and which thinner is immiscible with water, whereby said oil-soluble reaction product, simultaneously with the reaction, dissolves in the thinner and the by-product of the reaction simultaneously dissolves in the water, and separating the solution of the reaction product in the thinner from the aqueous solution of the by-product salts.

2. Process of producing a liquid drier for paints and varnishes having, as an active ingredient, an oil-soluble normal metal salt of a non-aromatic organic acid, which comprises reacting together, at a temperature below the boiling point of water, an aqueous solution of an alkali metal salt of such organic acid containing an excess of free acid of the same kind, and an aqueous solution of an inorganic drying metal salt in the immediate presence of a liquid coating composition thinner which is a solvent for the oil-soluble reaction product which is substantially insoluble in water and which thinner is immiscible with water, whereby said oil-soluble reaction product and excess free acid, simultaneously with the reaction, dissolve in the thinner and the by-product of the reaction simultaneously dissolves in the water, and separating the solution of the reaction product in the thinner from the aqueous solution of the by-product salts.

3. Process of producing a liquid normal metal naphthenate drier for paints and varnishes, which consists in reacting together, at a temperature below the boiling point of water, an aqueous solution of an alkali metal naphthenate and an aqueous solution of an inorganic salt of a metal of the group consisting of cobalt, manganese, iron, lead and zinc in the immediate presence of a liquid coating composition thinner which is a solvent for the naphthenate reaction product which is substantially insoluble in water and which thinner is immiscible with water, whereby said naphthenate reaction product will, simultaneously with the reaction, dissolve in the thinner and the by-product of the reaction simultaneously dissolves in the water, and separating the solution of the naphthenate reaction product in the thinner from the aqueous solution of the by-product salts.

4. Process of producing a liquid normal metal linoleate drier for paints and varnishes, which consists in reacting together, at a temperature below the boiling point of water, an aqueous solution of an alkali metal linoleate and an aqueous solution of an inorganic salt of a metal of the group consisting of cobalt, manganese, iron, lead and zinc in the immediate presence of a liquid coating composition thinner which is a solvent for the linoleate reaction product which is substantially insoluble in water and which thinner is immiscible with water, whereby said linoleate reaction product will, simultaneously with the reaction, dissolve in the thinner and the by-product of the reaction simultaneously dissolves in the water, and separating the solution of the linoleate reaction product in the thinner from the aqueous solution of the by-product salts.

5. Process of producing a liquid normal metal naphthenate drier for paints and varnishes, which consists in reacting together, at a temperature below the boiling point of water, an aqueous solution of an alkali metal naphthenate containing an excess of free naphthenic acid and an aqueous solution of an inorganic salt of a metal of the group consisting of cobalt, manganese, iron, lead and zinc in the immediate presence of a liquid coating composition thinner which is a solvent for the naphthenate reaction product which is substantially insoluble in water and which thinner is immiscible with water whereby said naphthenate reaction product and excess free naphthenic acid, simultaneously with the reaction, dissolves in the thinner and the by-product of the reaction simultaneously dissolves in the water, and separating the solution of the naphthenate reaction product in the thinner from the aqueous solution of the by-product salts.

6. Process of producing a liquid normal metal linoleate drier for paints and varnishes, which consists in reacting together, at a temperature below the boiling point of water, an aqueous solution of an alkali metal linoleate containing an excess of free linoleic acid and an aqueous solution of an inorganic salt of a metal of the group consisting of cobalt, manganese, iron, lead and zinc in the immediate presence of a liquid coating composition thinner which is a solvent for the linoleate reaction product which is substantially insoluble in water and which thinner is immiscible with water, whereby said linoleate reaction product and excess free linoleic acid, simultaneously with the reaction, dissolves in the thinner and the by-product of the reaction simultaneously dissolves in the water, and separating the solution of the linoleate reaction product in the thinner from the aqueous solution of the by-product salts.

7. Process of producing a liquid drier for paints and varnishes having, as an active ingredient, an oil-soluble metal salt of a non-aromatic organic acid, which comprises reacting together at a temperature below the boiling point of water, an aqueous solution of an alkali metal salt of such organic acid, and an aqueous solution of an inorganic drying metal salt in the immediate presence of a liquid coating composition thinner which is a solvent for the oil-soluble reaction product which is substantially insoluble in water and which thinner is immiscible with water, whereby said oil-soluble reaction product simultaneously with the reaction, dissolves in the thinner and the by-product of the reaction simultaneously dissolves in the water, and separating the solution of the reaction product in the thinner from the aqueous solution of the by-product salts.

8. Process of producing a liquid drier for paints and varnishes having, as an active ingredient, an oil-soluble metal salt of naphthenic acid, which comprises reacting together at a temperature below the boiling point of water, an aqueous solution of an alkali metal salt of such naphthenic acid and an aqueous solution of an inorganic drying metal salt in the immediate presence of a liquid coating composition thinner which is a solvent for the oil-soluble reaction product which is substantially insoluble in water and which thinner is immiscible with water, whereby said oil-soluble reaction product simultaneously with the reaction, dissolves in the thinner and the by-product of the reaction simultaneously dissolves in the water, and separating the solution of the reaction product in the thinner from the aqueous solution of the by-product salts.

LEO ROON.
WALTER GOTHAM.